US006028890A

United States Patent [19]
Salami et al.

[11] Patent Number: 6,028,890
[45] Date of Patent: Feb. 22, 2000

[54] BAUD-RATE-INDEPENDENT ASVD TRANSMISSION BUILT AROUND G.729 SPEECH-CODING STANDARD

[75] Inventors: Redwan Salami; Claude Laflamme; Jean-Pierre Adoul, all of Sherbrooke, Canada; Ali S. Sadri; Sasan Ardalan, both of Cary, N.C.; Hua Ye, Durham, N.C.

[73] Assignees: International Business Machines Corporation, Armonk, N.Y.; University de Sherbrooke, Sherbrooke, Canada

[21] Appl. No.: 08/868,810

[22] Filed: Jun. 4, 1997

Related U.S. Application Data

[60] Provisional application No. 60/018,969, Jun. 4, 1996.

[51] Int. Cl.[7] .............................. H04L 27/00; H04B 1/38
[52] U.S. Cl. .......................... 375/216; 375/222; 375/240
[58] Field of Search ................................ 375/377, 216, 375/240, 242, 222; 364/724.1; 704/500, 503

[56] References Cited

U.S. PATENT DOCUMENTS

| | | | |
|---|---|---|---|
| 5,546,395 | 8/1996 | Sharma et al. | 375/246 |
| 5,819,215 | 10/1998 | Dobson et al. | 704/230 |
| 5,870,465 | 2/1999 | Hosbach et al. | 379/93.07 |

OTHER PUBLICATIONS

International Telecommunication Union, ITU–T Recommendation G.729, General Aspects of Digital Transmission Systems, Coding of Speech at 8 kbit/s Using Conjugate–Structure Algebraic–Code–Excited Linear–Prediction (CS–ACELP), Mar. 1996.

International Telecommunication Union, ITU–T Recommendation V.34, Series V: Data Communication Over the Telephone Network, Interfaces and Voiceband Modems, A modem operating at data signalling rates of up to 33 600 bit/s for use on the general switched telephone network and on leased point–to–point 2–wire telephone–type circuits, Feb. 1998.

International Telecommunication Union, ITU–T Recommendation G.729, Annex A, Series G: Transmission Systems and Media, Digital transmission systems—Terminal equipments—Coding of analogue signals by methods other than PCM, Coding of speech at 8 kbit/s using conjugate structure algebraic–code–excited linear–prediction (CS–ACELP), Annex A: Reduced complexity 8 kbit/s CS–ACELP speech codec, Nov. 1996.

(List continued on next page.)

*Primary Examiner*—Tesfaldet Bocure
*Attorney, Agent, or Firm*—Griffin, Butler, Whisenhunt&Seipl, LLP

[57] ABSTRACT

A method and device for analog simultaneous voice and data transmission over an analog channel encodes at a voice signal sampling rate a sampled voice signal including spectral and pitch information. During encoding, the spectral and pitch information is extracted from the sampled voice signal to produce a residual signal, and the residual signal is converted into a sequence of residual vectors at a Baud rate. Then, a bitstream including non voice data and the extracted spectral and pitch information is produced. A modem unit, operating at Baud rate and producing an output carrier wave supplied to the analog channel, produces a sequence of symbol vectors in response to the sequence of residual vectors and the bitstream, and modulates the output carrier wave in response to the sequence of symbol vectors. A fractional sampling-rate conversion is conducted on the residual signal by shifting the voice signal sampling rate by a factor M/N, where M and N are the smallest integers that verify, or closely verify, the equality M/N=2R/F, where R is the Baud rate and F is the voice signal sampling rate. This fractional sampling-rate conversion further involves anti-aliasing filtering of the residual signal. In this manner, encoding operates at a voice signal sampling rate independent of the modem's Baud rate.

20 Claims, 2 Drawing Sheets

OTHER PUBLICATIONS

International Telecommunication Union, ITU–T Recommendation G.729, Annex B, Series G: Transmission Systems and Media, Digital transmission systems—Terminal equipments—Coding of analogue signals by methods other than PCM, Coding of speech at 8 kbit/s using conjugate structure algebraic–code–excited linear–prediction (CS–ACELP), Annex B: A silence compression scheme for G.729 optimized for terminals conforming to recommendation V.70, Nov. 1996.

International Telecommunication Union, CCITT Recommendation G.726, General Aspects of Digital Transmission Systems; Terminal Equipments, 40, 32, 24, 16 kbit/s Adaptive Differential Pulse Code Modulation (ADPCM), Geneva, 1990.

John R. Deller, Jr. et al., "Discrete–Time Processing of Speech Signals", Macmillan Publishing Co., pp. 474–476, 1993.

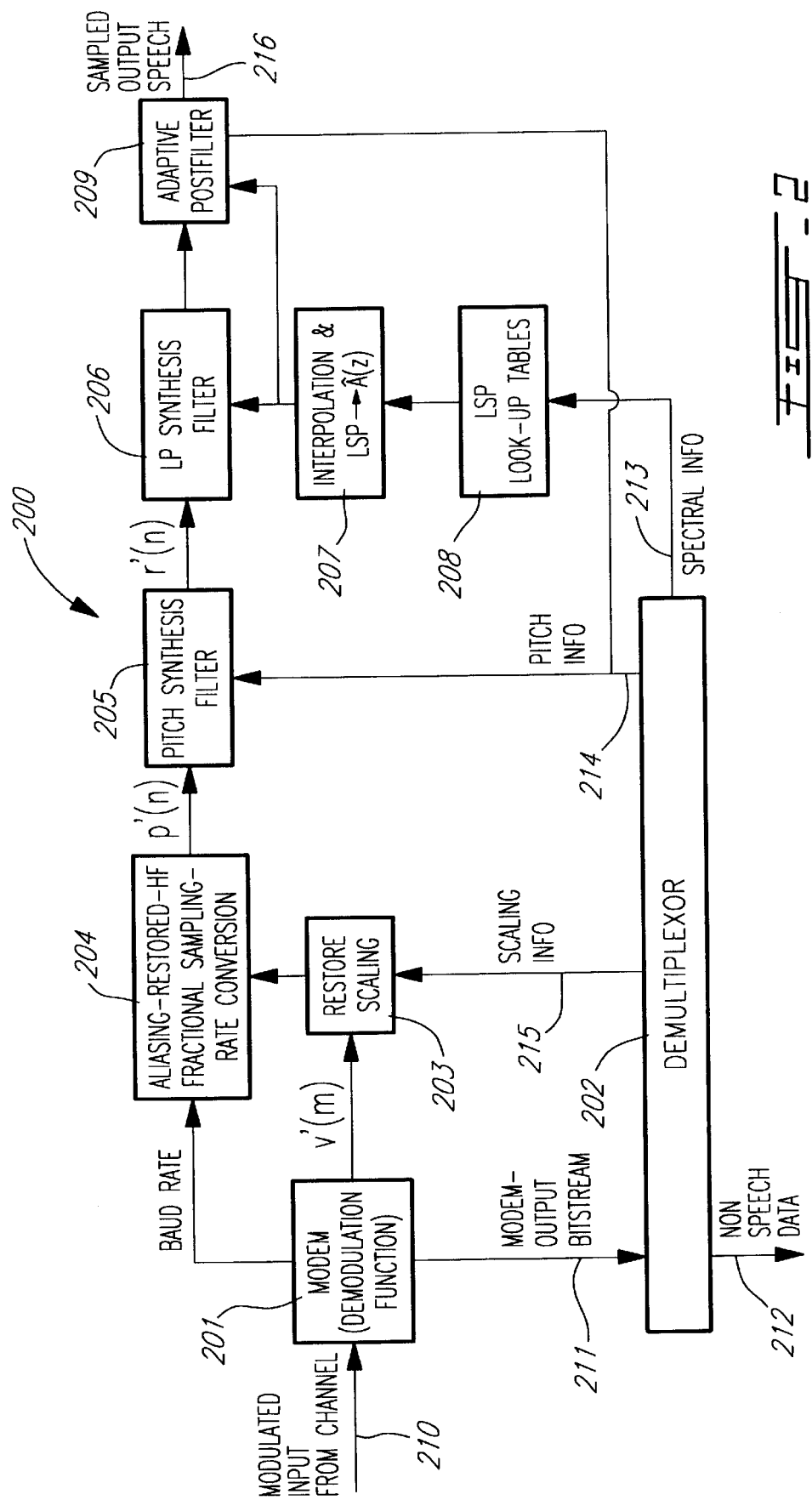

BAUD-RATE-INDEPENDENT ASVD TRANSMISSION BUILT AROUND G.729 SPEECH-CODING STANDARD

This application claims benefit of Provisional Application No. 60/018,969, filed Jun. 4, 1996.

BACKGROUND OF THE INVENTION

1. Field of the Invention

The present invention is concerned with the field of communications and more particularly to a method and system for Analog Simultaneous transmission of Voice and Data (ASVD) over an analog channel such as, for example, a telephone line.

In the present specification and in the appended claims, the term "voice" is intended to include speech as well as other sound signals; the ASVD method and system according to the invention are not restricted to voice but can be used for music and other sound signals.

2. Brief Description of the Prior Art

Data in digital format are sent over analog channels using modem devices which perform the necessary modulation and demodulation operations. The International Telecommunication Union— Telecommunication sector (ITU-T) is an international standardization body which makes recommendation relating to modem specifications. Recommendation V. 34 of the ITU-T describes the specifications of a modem operating at data signalling rates of up to 33 600 bits/second for use on the general switched telephone network and on leased point-to-point 2-wire telephone-type circuits. Also, recommendation G. 729A of the ITU-T describes the specifications of an 8 kbits/second voice encoder using Conjugate-Structure Algebraic-Code Excited Linear Prediction (CS-ACELP). Recommendation G. 729A is also known as the DSVD standard since it is the ITU-T recommendation for Digital Simultaneous transmission of Voice and Data.

An alternate method to using the DVSD standard is the so-called ASVD (Analog Simultaneous transmission of Voice and Data) proposal. This alternate method has been considered by the ITU-T for possible standardization with the V. 35 modem recommendation under the proposed recommendation number V. 34Q.

The ASVD methods proposed in prior art are based on the well known speech transmission approach called Residual-Excited Linear Prediction (RELP). According to this approach, the transmitted voice is obtained by filtering a so-called residual signal through a cascade of two time-varying filters called the pitch synthesis filter and the LP (Linear Prediction) synthesis filter. In ASVD, as in RELP, the coefficients of both the pitch and LP synthesis filters are digitally encoded and updated on a regular basis. The sampled residual signal is also digitally encoded in RELP; this is in contrast to ASVD wherein the residual-signal samples are added, so to speak, to the modulation. More precisely, the first and second samples of each successive pair of residual samples is added to the In-phase and In-quadrature components, respectively, of the associated modulation scheme.

According to this method residual samples can be transmitted at twice the modem Baud rate. Note that these residual samples can be viewed as artificial channel noise. This observation entails the two following facts:

First, residual samples must be scaled so as to be confined to a safe amplitude range in order not to interfere with the proper modem operation; and Secondly, if the channel condition is very good, the scaled but unquantized residual samples will be received with very little degradation due to the added true channel noise.

Some of the major shortcomings of the ASVD prior art methods are the following:

1. Limited to point-to-point modem connections and inability to support other transport mechanisms such as the DSVD standard (G. 729A);
2. Inability to operate at bit rates of 8 kbits/second and below resulting in very low data throughput;
3. Lack of a convenient method to provide voice security through data encryption; and
4. Reduced speech and audio bandwidth since the audio sampling rate is restricted to be twice the modem Baud rate. For instance, in the V. 34 modem case, the Baud rate ranges from 2400 to 3429. It follows that, in the worst case, the speech and audio signal is sampled at 4800 samples/second; band limiting the signal below 2400 Hz is then required to prevent aliasing. The approach results in a poor transmission quality specially for fricatives and music signals.

OBJECTS OF THE INVENTION

An object of the present invention is to provide an improved ASVD method and system overcoming the above mentioned shortcomings of the prior art.

Another object of the present invention is to provide an improved ASVD method and system in which the sampling rate is independent of the Baud rate of the associated modem.

A further object of the present invention is to provide an improved ASVD method and system capable of being achieved using most of the modules of the standard DSVD (i.e. recommendation G. 729A of the ITU-T) thereby enabling the integration of DSVD and ASVD, and, capitalizing on the numerous advantages and features of the DSVD approach in terms quality and robustness. The present invention can therefore be assimilated to an analog extension of the DSVD standard.

SUMMARY OF THE INVENTION

In accordance with a first aspect, the present invention relates to an analog simultaneous voice and data transmission method in which a sampled voice signal including spectral and pitch information is encoded. In this encoding procedure operating at the voice signal sampling rate, the spectral and pitch information is extracted from the sampled voice signal to produce a residual sampled voice signal, and the residual sampled voice signal is converted into a sequence of residual vectors at a Baud rate. A bitstream including non voice data and the extracted spectral and pitch information is produced, and a modem unit operating at the Baud rate produces a modulated output carrier wave supplied to an analog transmission channel. The modem unit is used to produce a sequence of symbol vectors in response to the sequence of residual vectors and the bitstream, and to modulate the output carrier wave in response to the sequence of symbol vectors. In this analog simultaneous voice and data transmission method, the improvement is concerned with a fractional sampling-rate conversion conducted on the residual sampled voice signal to convert this residual sampled voice signal at the voice signal sampling rate into the sequence of residual vectors at the Baud rate. The fractional sampling-rate conversion comprises anti-aliasing filtering the residual sampled voice signal. A major advantage of the analog simultaneous voice and data transmission method is that the encoding step operates at a voice signal sampling rate independent of the Baud rate.

The present invention also relates to a system for conducting the above described analog simultaneous voice and data transmission method.

According to a first preferred embodiment, the residual sampled voice signal includes sharp peaks in which most of the energy of the residual sampled voice signal is concentrated and, prior to conducting the fractional sampling-rate conversion, the residual sampled voice signal is peak-dispersion filtered to disperse the concentration of energy and thereby reduce the amplitude range of the residual sampled voice signal without modifying spectral magnitude properties of that voice signal. The peak-dispersion filtering may be performed by means of either a time invariant all-pass filter having an impulse response spread over several samples of the voice signal, or an all-pass filter having a slowly time-varying transfer function to adjust a time-varying parameter related to a speaker's average pitch rate.

In accordance with another preferred embodiment, the fractional sampling-rate conversion is made by shifting the voice signal sampling rate by a factor M/N, where M and N are integers that verify, or closely verify, the following equality:

$$\frac{M}{N} = \frac{2R}{F}$$

where R is the Baud rate and F is the voice signal sampling rate. When the fractional sampling-rate conversion is a fractional down-sampling-rate conversion, the shifting step comprises expanding the residual sampled voice signal by inserting M-1 zeros between each pair of successive samples of the residual sampled voice signal, and the anti-aliasing filtering comprises low-pass filtering the expanded residual sampled voice signal with a normalized cut-off frequency of π/N radians to produce a low-pass filtered signal decimated by the factor N. The sampled voice signal and the residual sampled voice signal are formed of samples grouped into successive frames having a fixed duration, the expanded residual sampled voice signal is low-pass filtered through a non causal low-pass filter having a finite impulse response with 1+2×J×M non-zero coefficients, J being an integer, and J temporary samples of the forthcoming frame of the residual sampled voice signal are obtained to perform the non causal low-pass filtering without perceptual distortion. More specifically, the J temporary samples are obtained by filtering the first J samples of the forthcoming frame of the sampled voice signal in accordance with spectral and pitch information of the current frame of the sampled voice signal.

A further preferred embodiment includes a scaling of the low-pass filtered signal decimated by the factor N so that the amplitude of this low-pass filtered signal ranges within a fixed interval ±B, B being a given amplitude value. Information about scaling of the low-pass filtered signal decimated by the factor N is introduced in the bitstream.

The analog simultaneous voice and data transmission method and system according to the present invention are advantageously implemented around at least a part of the components described in recommendation G.729A of the International Telecommunication Union—Telecommunication sector.

In accordance with a second aspect, the present invention relates to an analog simultaneous voice and data reception method in which a modem unit operates at a Baud rate and receives a carrier wave propagated through an analog transmission channel and modulated by a sequence of symbol vectors produced in response to a sequence of residual vectors representative of a sampled voice signal and a bitstream including non voice data and pitch and spectral information about the sampled voice signal. The modem unit is used to demodulate the modulated carrier wave to recover the sequence of symbol vectors, and to extract the sequence of residual vectors and the bitstream from the sequence of symbol vectors. The non voice data and the spectral and pitch information are extracted from the bitstream and, in response to the extracted sequence of residual vectors and the spectral and pitch information, the sampled voice signal is decoded. In the analog simultaneous voice and data reception method, the improvement comprises a fractional sampling-rate conversion conducted prior to decoding the sampled voice signal on the extracted sequence of residual vectors so as to convert the extracted sequence of residual vectors at the Baud rate to a residual sampled voice signal at a voice signal sampling rate. A major advantage of the analog simultaneous voice and data reception method is that the sampled voice signal decoding step operates at a voice signal sampling rate independent of the Baud rate.

The present invention also relates to a system for conducting the above described analog simultaneous voice and data reception method.

In accordance with a preferred embodiment:
the fractional sampling-rate conversion comprises shifting the Baud rate by factor N/M, where N and M are integers that verify, or closely verify, the following equality:

$$\frac{N}{M} = \frac{F}{2R}$$

where F is the voice signal sampling rate and R is the Baud rate;
the fractional sampling-rate conversion is a fractional up-sampling-rate conversion comprising expanding the sequence of residual vectors by inserting N-1 zeros between each pair of successive samples of the sequence of residual vectors, and low-pass filtering the expanded sequence with a normalized cut-off frequency of π/M radians to produce a low-pass filtered signal decimated by the factor M;
the sampled voice signal and the sequence of residual vectors are formed of samples grouped into successive frames having a fixed duration, the expanded sequence of residual vectors is low-pass filtered through a non causal low-pass filter having a finite impulse response with 1+2×J×M non-zero coefficients, J being an integer, and J temporary zero samples of the forthcoming frame of the sequence of residual vectors are used to perform the non causal low-pass filtering without causing perceptual distortion; and
the low-pass filtering step with a normalized cut-off frequency of π/M radians comprises introducing aliasing between π/N and π/M radians to fill-in for a missing high-frequency band of the residual sampled voice signal with no perceptual consequence.

Again, analog simultaneous voice and data reception method and system according to the present invention are advantageously implemented around at least a part of the components described in recommendation G.729A of the International Telecommunication Union—Telecommunication sector.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 2 is a schematic block diagram of an ASVD decoder in accordance with the invention.

DETAILED DESCRIPTION OF THE PREFERRED EMBODIMENT

Figure 1:
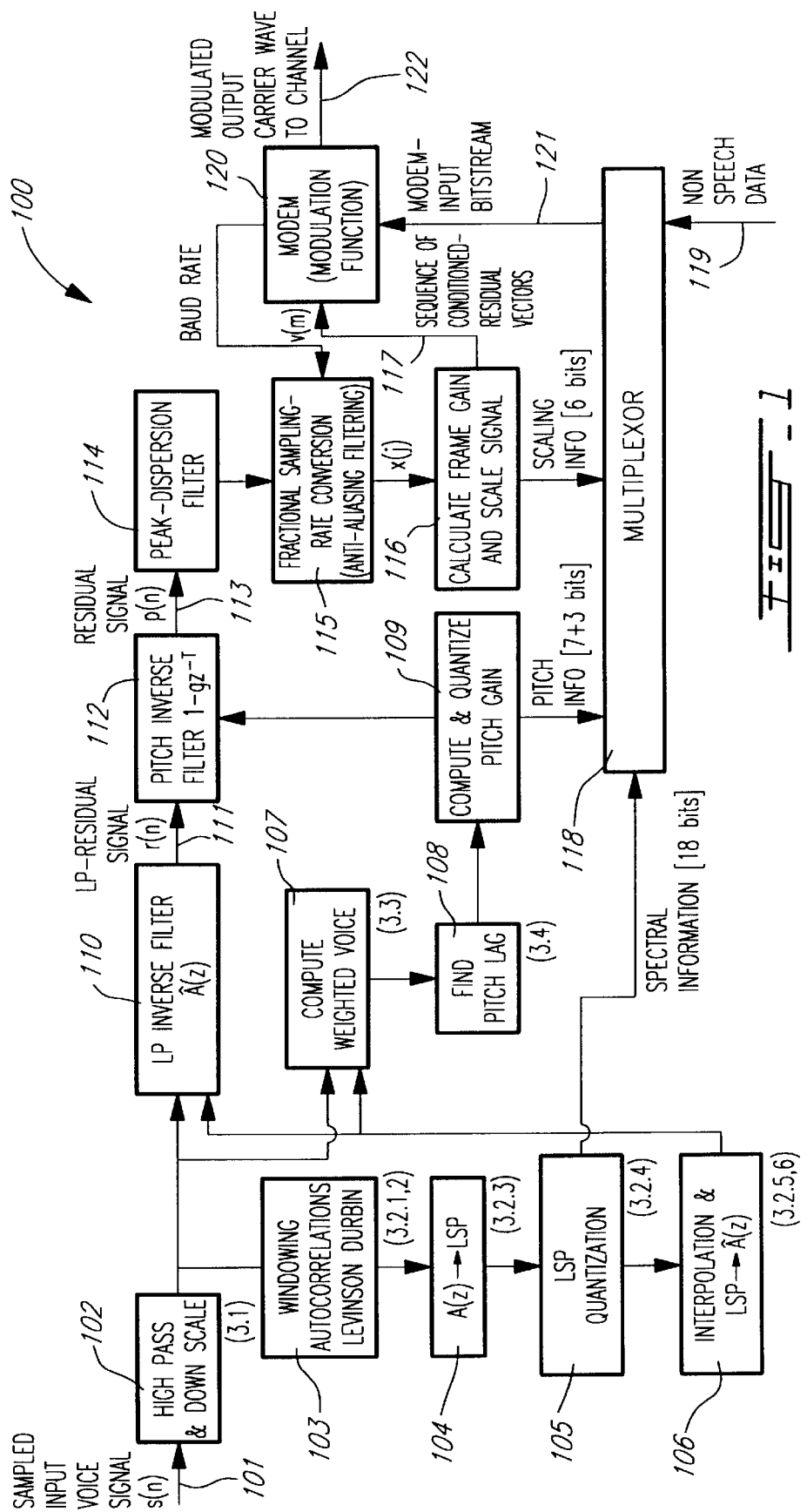
FIG. 1 is a schematic block diagram of an ASVD (Analog Simultaneous transmission of Voice and Data) encoder in accordance with the present invention.

A preferred embodiment of the ASVD (Analog Simultaneous transmission of Voice and Data) method and system in accordance with the present invention will be described in detail in the following description. In this ASVD method and system:

voice processing is performed at a fixed sampling rate independent of the Baud rate of the associated modem; and the functionality maximally overlaps that of the G. 729A recommendation.

Even though the ASVD method and system of the present invention, exhibiting the above mentioned fixed sampling rate feature can be described without any reference to the G. 729A recommendation of the ITU-T, the following detailed description will present, in combination, the fixed sampling rate feature and the overlap of the ASVD method and system of the invention with the G. 729A recommendation.

The detailed description of the G. 729A recommendation is found in the ITU-T document *"Recommendation G. 729—Annex A: Reduced Complexity 8 kbits/s CS-ACELP Speech Codec"*. This document along with an equivalent software description is available from ITU-T and is hereby incorporated by reference. The functions used to describe the subject invention and which are part of the recommendation G. 729A correspond to modules 102 through 108 of FIG. 1. For easy reference, a number in parentheses appears next to each module 102–108 to indicate the particular section of the above mentioned ITU-T document describing the corresponding function. This reference to the G.729A recommendation should not be interpreted as an admission that this standard constitutes valid prior art against the present invention as claimed. Also, the reference to the G. 729A recommendation should not be construed as limiting the scope of the appended claims to the particular requirements of this standard.

Encoder

The ASVD system in accordance with the present invention comprises, at the transmission end, an encoder 100 schematically illustrated under the form of block diagram in FIG. 1. The block diagram of FIG. 1 is also illustrative of the ASVD voice encoding algorithm.

In the preferred embodiment of the ASVD system, the voice signal to be encoded is first sampled at a rate of 8000 samples/second and divided into successive frames of fixed duration to produce a sampled input voice signal (s(n), n being a time index corresponding to the voice signal sampling rate F=8000 Hz) 101.

The sampled input voice signal 101 is then pre-processed by module 102. More specifically, module 102 high-pass filters the sampled voice signal 101 to remove frequencies lower than 140 Hz and down scales the sampled voice signal 101 to prevent saturation in the subsequent steps.

The function of modules 103–106 is to extract from the sampled input voice signal 101 the spectral information for use in filters 107 and 110 and to be encoded for transmission through a multiplexor 118. For example, the spectral information is encoded in 18-bit word form. The particular operations used in recommendation G. 729A to fulfill this function with utmost voice quality are the following:

A Linear Prediction (LP) is performed once every 10 ms frame (every 80 samples) by module 103 using an autocorrelation approach with a 30 ms asymmetric window. The Levison-Durbin algorithm is used to compute a 10th order LP filter whose coefficients A(z), where z is the usual variable of the so-called z-transform, are transformed to the LSP (Line Spectrum Pair) domain by module 104 for quantization (see module 105) and interpolation (see module 106) purposes. More specifically, module 105 quantizes the 10 LSP coefficients with 18 bits using a two-stage vector quantization and a switched $4^{th}$ order moving-average prediction. The frame is divided into two subframes of 5 ms. The second subframe of 5 ms contains the quantized LSP coefficients from module 105 whereas the first subframe contains another version of the LSP coefficients obtained by module 106 through interpolation between current and previous frames. Module 106 further transforms the sets of LSP coefficients of the first and second subframes back to the LP filter coefficient domain ($\hat{A}(z)$) to update an LP inverse filter 110.

Modules 107–110 and 112 produce a residual signal (p(n)) 113 at the output of two cascaded filters; the first filter removes the spectral component of the sampled voice signal and the second filter removes the pitch component of this sampled voice signal. The steps carried out by modules 107–110 and 112 are the following:

an LP-residual signal (r(n)) 111 is produced by filtering the pre-processed sampled voice signal from module 102 through a $10^{th}$ order LP inverse filter 110 whose coefficients are updated twice per frame by the sets of LSP coefficients of the first and second subframes transformed back to the LP filter coefficient domain ($\hat{A}(z)$) by module 106;

module 107 is responsive to the pre-processed sampled voice signal from module 102 and to the two sets of LP filter coefficients $\hat{A}(z)$ from module 106 to compute a frequency-weighted voice signal;

the frequency-weighted voice signal from module 107 is supplied to module 108 which then conducts a pitch analysis routine to find a proper pitch lag; this efficient low complexity routine uses decimation and pitch sub multiple testing as described in section 3.4 of the G.729A ITU-T document;

after the proper pitch lag is found, module 109 computes and quantizes the pitch gain g, and provides the pitch information to both the pitch inverse filter 112 and the multiplexor 118 in the form of a 7-bit word for the pitch lag and a 3-bit word for the quantized pitch gain; and finally, the pitch inverse filter 112, whose transfer function is expressed as $1-gz^{-T}$ is used to remove the pitch component from the LP-residual signal (r(n)) 111 to output the desired residual sampled voice signal 113 which is denoted by p(n) where n is the time index corresponding to the sampling rate F=8000 Hz.

Modules 114–116 process the residual signal 113, both in terms of sampling rate and amplitude range, in such a way as to meet the constraints of modem 120. More specifically, modem 120 must be supplied with a conditioned-residual vector sequence 116 denoted v(m) where v is a two-component vector and m is a time index corresponding to the particular Baud rate at which the modem is operating. The three inventive steps carried out by modules 114–116 are explained in the following description.

Module 114:

Module 114 is a peak-dispersion filter reducing on the average the amplitude range of the residual signal without, however, modifying its spectral magnitude properties. This step takes advantage of the psychoacoustic properties of the ear; the ear is sensitive to the spectral magnitude but not to the spectral phase of a voice signal. This step is efficient since, most of time, the residual signal 113 still contains sharp peaks, occurring at the pitch rate and where most of the energy of the residual sampled voice signal is concentrated. Peak-dispersion filter 114 disperses this energy concentration thereby substantially reducing the amplitude range. There are several ways in which the peak-dispersion filter 114 can be implemented. Various Fourier-like transform manipulations can be used to randomize the phase. The most straightforward solution, however, is to implement peak-dispersion filter 114 as an all-pass filter whose transfer function is based on the well-known property of pole-zero dual pairs. For example, peak-dispersion filter 114 can be a time invariant all-pass filter with an impulse response spread over several samples, e.g. the first 20 samples. The all-pass filter can alternatively be slowly time-varying to adjust to time-varying parameters such as the speaker's average pitch rate. It should be noted that an alternative implementation consists of introducing module 114 before filter 112 or before filter 110 with the same purpose of dispersing the energy concentration of the resulting residual sampled voice signal.

Module 115:

Module 115 is a fractional down-sampling-rate conversion module. The function of this fractional down-sampling-rate conversion module 115 is to lower the sampling rate from 8000 samples/second (corresponding to the preferred embodiment described herein) to twice the modem Baud rate. In the case where the sampling rate is lower than twice the Baud rate, the conversion is a fractional up-sampling-rate conversion. As illustrated in FIG. 1, the Baud rate is supplied to module 115 by the modem 120. For V. 34 modem ITU-T recommendation, six Baud rates are available the lowest being 2400 Bauds/second (or 2400 symbols/second). Assuming a V. 34 modem implementation, fractional down-sampling-rate conversion module 115 can be set to one of six possible modes according to the current Baud rate being used. Fractional down-sampling-rate conversion module 115 operates a shifting of the sampling rate of the residual sampled voice signal p(n) by factor M/N, where M and N are the smallest integers that verify, or closely verify, the following equality:

$$\frac{M}{N} = \frac{2R}{F}$$

where R is the Baud rate for a given mode of the fractional down-sampling-rate conversion module 115 and F is the residual-signal sampling rate (in the example given in the present disclosure, F=8000 Hz).

For a V. 34 modem, the available Baud rates are given in the following table along with M, N and K, the number of samples in the fractional down-sampled output x(j) of module 115.

| R | 2400 | 2743   | 2800 | 3000 | 3200 | 3429   |
|---|------|--------|------|------|------|--------|
| M | 3    | 2/(3)  | 7    | 3    | 4    | 6/(7)  |
| N | 5    | 3      | 10   | 4    | 5    | 7      |
| K | 48   | 54/(55)| 56   | 60   | 64   | 68/(69)|

Since M/N is less than one for any of the six Baud rates of V. 34 modem ITU-T recommendation, the fractional sampling-rate conversion is always a fractional down-sampling-rate operation. To perform this fractional down-sampling-rate operation, the peak-dispersion filtered, residual sampled voice signal supplied to the input of the fractional down-sampling-rate conversion module 115 is expanded by inserting M-1 zeros between each pair of successive, adjacent samples of the residual sampled voice signal. As indicated in the above table, for Baud-rates 2743 and 3429, the M/N ratio is an approximation. Therefore, an extra zero will be inserted between samples whenever required to maintain the proper fractional rate with reference to a continuous time scale.

The expanded residual sampled voice signal is then low-pass filtered with a normalized cut-off frequency of $\pi/N$ radians to avoid aliasing. The output of the fractional down-sampling module 115 is a low-pass filtered signal decimated by factor N. It should be pointed out here that some spectral information is unavoidably lost in a down-sampling operation; it is indeed the case since a high-frequency band of the spectrum of the residual sampled voice signal p(n) is lost (between $\pi/N$ and $\pi/M$ radians). However, as this will be described hereinafter, the present invention provides for artificially restoring the high-frequency band of the spectrum at the decoder (FIG. 2).

Finally, decimation of the low-pass filtered signal by factor N results in output frames of K samples. Note that for Baud rates 2743 and 3429, the decimation step consists, so to speak, of "sampling" every 1/F second on a continuous time scale by choosing the nearest low-pass-filtered-signal sample. Occasionally, this decimation process will result in two identical consecutive output samples and therefore decimated frames having an occasional extra sample.

The above expansion and low-pass filtering steps are conducted simultaneously thereby reducing the number of multiplications involved. More precisely, the low-pass filter has an Finite Impulse Response (FIR) with 1+2×J×M non zero coefficients with even or odd symmetry with respect to the origin, where J is an integer equal to 11 in the preferred implementation. Because of expansion and symmetry of that response, only J multiplications are needed per decimated sample outputted from module 115. Furthermore, since the low-pass filter is not causal, it is necessary to know the first J samples of the forthcoming frame of the residual signal 113. However, spectral and pitch information are not yet known for said forthcoming frame. The following method is used to perform the non causal low-pass filtering without perceptual degradation or distortion: J temporary samples of the residual sampled voice signal are obtained by filtering the first J samples of the forthcoming frame of the sampled voice signal through filters 110 and 112 according to spectral and pitch information of the current frame of the sampled voice signal.

Module 116:

Module 116 scales the input signal, say x(j), so that the amplitude of this input signal ranges within a fixed interval ±B, B being a given amplitude value. Typically, 2B corresponds to 90% of the minimum distance of the constellation of the modem 120.

To this end, a gain G is computed once per frame. More than one value of gain G can be computed per frame for a more accurate piecewise scaling of the residual sampled voice signal provided that a larger number of bits are assigned to the gain information. Gain G is a function of one or more features of the frame of residual signal samples:

$$G=f(G_1, G_2, \ldots)$$

Typical features include the following features:

$$G_1 = \max_{j=0,\ldots K-L} \sqrt{\frac{1}{L} \sum_{i=j}^{L+j-1} x^2(i)}$$

$$G_2 = \max_j(|x(j)|)$$

Feature $G_1$ is the largest root-mean-square value over L consecutive samples found in the frame; a typical value for L is 16. Feature $G_2$ is the largest absolute sample value in the frame.

The scaling factor G is quantized with 6 bits using a uniform quantizer in the logarithmic domain. Module 116 divides each sample by said scaling factor with saturation to the allowable interval ±B. More specifically, if y(j) denotes the result, this double operation can be expressed as follows:

$$y(j) = \begin{cases} B & \text{if } B < x(j)/G \\ x(j)/G & \text{if } -B < x(j)/G < B \\ -B & \text{Otherwise} \end{cases}$$

There are many variant methods which fulfill the purpose of module 116. The above "hard" saturation operation can be advantageously replaced by a non-linear compounding function such as one derived from the bipolar sigmoidal function given below:

$$y(j) = \frac{2B}{1 + \exp(-x(j)/G)} - B$$

The sequence of conditioned-residual vectors 117 outputted from module 116 is denoted v(m) where v is a two-component vector and m is a time index corresponding to the Baud rate of modem 120. It can be expressed as follows:

$$v(m)=[y(2m), y(2m+1)]$$

where m ranges from 0 to K/2–1 within a fractional down-sampled-rate frame of the residual sampled voice signal.

The multiplexor 118 supplies the modem 120 with a bit stream 121 composed of:
spectral information, encoded in 18-bit word form, from module 105;
pitch information from module 109, the pitch information comprising a pitch lag encoded in 7-bit word form and a pitch gain g encoded in 3-bit word form;
scaling information, encoded in 6-bit word form, from module 116; and
non-voice data 119.

Of course, the spectral, pitch and scaling information is related to the voice to be encoded, In response to the bitstream 121 from the multiplexor 118, the modulation function of the modem 120 selects, at each instant of time defined by the time index m (again m is the time index corresponding to the Baud rate of modem 120), a particular vector w(m) out of a collection of possible vectors; this collection of vectors w(m) is called the modem constellation. Constellation vector w(m) is a two-dimensional vector having an in-phase as well as an in-quadrature components according to well known modem principles. In the ASVD approach, z(m)=w(m)+v(m) is used in the place of z(m)=w(m) as symbol vector to be modulated thereby allowing an analog transmission of the sequence of conditioned-residual vectors 117. Of course, modem 120 modulates its output carrier wave 122 in relation to the sequence of symbol vectors, with modulated output carrier wave 122 being propagated through an analog transmission channel.

Decoder

The ASVD system in accordance with the present invention also comprises, at the reception end, a decoder 200 schematically illustrated under the form of a block diagram in FIG. 2. Of course, the block diagram of FIG. 2 is also illustrative of the ASVD voice decoding algorithm.

If compared to the encoder 100, the decoder 200 performs essentially the reverse operations in reverse order. However, it should be pointed out that the up-sampling operation carried out by module 204 of FIG. 2 includes an additional and original feature according to which aliasing is used to restore the missing high-frequency band of the residual sampled voice signal spectrum.

Referring to FIG. 2, the demodulation function of the modem 201 retrieves a symbol vector z'(m) from the modulated input carrier wave 210 received from the analog transmission channel. The symbol vector z'(m) can be expressed as follows:

$$z'(m)=w(m)+v'(m)$$

where w(m) is the closest neighbour of z'(m) within the constellation of the modem 201. As indicated in the foregoing description, the constellation of a modem is a finite set of possible constellation vectors w(m). The constellation vector w(m), determined at each successive instant of time defined by the time index m, is translated into an output bitstream 211 of the modem 201, which output bit stream 211 is demultiplexed by a demultiplexor 202 into:
non voice data 212 to thereby recover the non voice data 119 of FIG. 1; and
voice related data, more specifically the spectral information 213 corresponding to the spectral information from module 105 of FIG. 1, the pitch information (pitch lag and gain) 214 corresponding to the pitch information from module 109 of FIG. 1, and the scaling information 215 corresponding to the scaling information from module 116 of FIG. 1.

Vector v'(m) is the difference between the receive symbol vector z'(m) and the said closest neighbour w(m). Vector v'(m) is, in fact, the sum of the following two elements:

$$v'(m)=v(m)+\eta(m)$$

where v(m) is the true conditioned-residual vector signal (see 117 in FIG. 1) which was transmitted and η(m) correspond to channel-added noise. Unfortunately, these two quantities cannot be differentiated. For this reason, v'(m) is used henceforth as the best estimate for the current sequence of conditioned-residual vectors and is sent to module 203.

Module 203 restores the original amplitude of the sequence of conditioned-residual vectors using the scaling information 215 supplied by demultiplexor 202.

The function of module 204 is to restore the original voice signal sampling rate for the "received" residual sampled voice signal p'(n). Module 204 operates a fractional up-sampling-rate conversion to shift the Baud rate of modem 201 by a fraction 2N/M determined from the Baud-rate information available from the modem 201 (the conversion is a fractional down-sampling-rate conversion when the sampling rate is lower than twice the Baud rate). More specifically, module 204 expands the sequence of residual vectors from module 203 by inserting N-1 zeros between each pair of successive, adjacent samples of the sequence of residual vectors. The expanded sequence is then low-pass filtered with a normalized cut-off frequency of $\pi/M$ radians. Therefore, the output of module 204 is a low-pass filtered signal decimated by factor M. Note that by choosing a cut-off frequency of $\pi/M$ radians for the above mentioned expanded signal, aliasing was introduced between $\pi/n$ and $\pi/M$ radians. Such aliasing fills-in advantageously for the missing high-frequency band of the residual sampled voice signal p'(n) with no perceptual consequence. This is the case because of the following three reasons:

- the spectrum magnitude of the residual sampled voice signal is essentially flat;
- the left-over-pitch harmonic structure is the same across the band; and, finally,
- it takes advantage of the psychoacoutic fact that the human ear is not sensitive to spectral phases for frequencies above 2000 Hz.

Again, the expansion and low-pass filtering are performed simultaneously thereby reducing the number of multiplication involved. Low-pass filtering of the expanded sequence of residual vectors is made by a non causal low-pass filter having a Finite Impulse Response with 1+2×J×M non-zero coefficients with even or odd symmetry with respect to the origin, J being an integer equal to 8 in the preferred implementation. Since the low pass filter is non causal, it is necessary to know the first J samples of the forthcoming frame of the sequence of residual vectors. For that purpose, J temporary zero samples of the forthcoming frame of the sequence of residual vectors are used to perform the non causal low-pass filtering without causing perceptual distortion.

Pitch synthesis filter 205 uses the pitch information 214 (pitch lag and pitch gain) to retrieve the received LP-residual signal r'(n).

Module 208 uses look-up tables to decode the spectral information 213 into LSP coefficients.

Module 207 is the same as module 106 of FIG. 1. Therefore, module 207 supplies the LP synthesis filter 206 with two sets of linear-prediction coefficients Â(z), one set per 5-ms subframe.

LP synthesis filter 206 uses said sets of linear prediction coefficients Â(z) to reconstruct the received voice signal from the LP-residual signal r'(n) produced by the pitch synthesis filter 205.

Finally, adaptive postfilter 209 uses the pitch information 214 and the spectral information 213 (through modules 207 and 208) to artificially increase the harmonic and resonant frequencies of the reconstructed voice signal in order to enhance the subjective quality of the output voice according to the well know postfiltering technique.

The sampled voice signal (see 101 in FIG. 1) is recovered at the output 216 of FIG. 2.

The method and system in accordance with the present invention present, amongst other, the following major advantages:

1. It operates at a fixed sampling rate and therefore the quality is essentially independent of the Baud rate of the associated modem. In the analog extension of G. 729A for V.43 modem, the fixed bit rate is 8000 Hz which warrants a transmission bandwidth of 3600 Hz for the voice regardless of the Baud rate used.
2. G. 729A has a built-in error concealment procedure designed for insuring a good performance in the presence of frame erasures. This procedure can be used with an analog extension of G. 729A.
3. A robust and efficient VAD/DTX/CNG (voice activity detection/discontinuous transmission/comfort noise generation) already exists as recommendation G. 729B to enable the system to achieve significant reduction in the bit rate required for voice transmission in a normal conversation. This VAD/DTX/CNG algorithm can be used with an analog extension of G. 729A.
4. In terms of functionality, the ASVD method of the invention and standard DSVD overlap greatly (95%). Thus, a G. 729A derived ASVD can be achieved with a negligible complexity overhead, enabling efficient integration of both methods on the same chip.
5. An adaptive postfilter is used at the decoder of G. 729A in order to enhance the quality of synthesized audio. Experiments have shown that using this postfilter with an analog extention of G. 729A significantly improves the quality of reconstructed voice in the presence of channel noise. In fact, using this postfilter resulted in at least a 3 dB gain in channel SNR, which is equivalent to a 2400 bit/s gain in the data throughput.
6. By making analog transmission of the residual signal as an option in the context of G. 729A, the system is no longer limited to point-to-point modem connections. It can easily support other transport mechanisms as well as voice mail and storage by switching to the all-digital mode.

Although the present invention has been described hereinabove by way of a preferred embodiment thereof, this embodiment can be modified at will, within the scope of the appended claims, without departing from the spirit and nature of the subject invention.

What is claimed is:

1. In an analog simultaneous voice and data transmission method comprising:
    encoding a sampled voice signal including spectral and pitch information, said sampled voice signal encoding operating at the voice signal sampling rate and comprising:
        extracting the spectral and pitch information from the sampled voice signal to produce a residual sampled voice signal;
        converting the residual sampled voice signal into a sequence of residual vectors at a Baud rate; and
    producing a bitstream including (a) non voice data and (b) the extracted spectral and pitch information;
and, by means of a modem unit operating at said Baud rate and producing an output carrier wave supplied to an analog transmission channel, comprising:
    producing a sequence of symbol vectors in response to the sequence of residual vectors and the bitstream; and
    modulating the output carrier wave in response to the sequence of symbol vectors; the improvement comprising, in said residual sampled voice signal converting, conducting on said residual sampled voice signal a fractional sampling-rate conversion to convert said residual sampled voice signal at said voice signal sampling rate into the sequence of residual vectors at said Baud rate, the fractional sampling-rate conversion comprising anti-aliasing filtering the residual sampled voice signal, whereby said sampled voice signal encoding operates at a voice signal sampling rate independent of said Baud rate.

2. An analog simultaneous voice and data transmission method as recited in claim 1, wherein the residual sampled voice signal includes sharp peaks in which most of the energy of the residual sampled voice signal is concentrated, and wherein said residual sampled voice signal converting comprises, prior to conducting the fractional sampling-rate conversion, peak-dispersion filtering the residual sampled voice signal to disperse said concentration of energy and thereby reduce the amplitude range of the residual sampled voice signal without modifying spectral magnitude properties of said residual sampled voice signal.

3. An analog simultaneous voice and data transmission method as recited in claim 2, wherein said peak-dispersion filtering comprises processing the residual sampled voice signal through a time invariant all-pass filter having an impulse response spread over several samples of the voice signal.

4. An analog simultaneous voice and data transmission method as recited in claim 2, wherein said peak-dispersion filtering comprises processing the residual sampled voice signal through an all-pass filter having a slowly time-varying transfer function to adjust a time-varying parameter related to a speaker's average pitch rate.

5. An analog simultaneous voice and data transmission method as recited in claim 1, wherein conducting on said residual sampled voice signal a fractional sampling-rate conversion comprises shifting the voice signal sampling rate by a factor M/N, where M and N are integers that verify, or closely verify, the following equality:

$$\frac{M}{N} = \frac{2R}{F}$$

where R is the Baud rate and F is the voice signal sampling rate.

6. An analog simultaneous voice and data transmission method as recited in claim 5, wherein:
the fractional sampling-rate conversion is a fractional down-sampling-rate conversion and said voice signal sampling rate shifting comprises expanding the residual sampled voice signal by inserting M−1 zeros between each pair of successive samples of the residual sampled voice signal; and
the anti-aliasing filtering comprises low-pass filtering the expanded residual sampled voice signal with a normalized cut-off frequency of n/N radians to produce a low-pass filtered signal decimated by the factor N.

7. An analog simultaneous voice and data transmission method as recited in claim 6, wherein:
the sampled voice signal and the residual sampled voice signal are formed of samples grouped into successive frames having a fixed duration;
said low-pass filtering of the expanded residual sampled voice signal comprises processing said expanded residual sampled voice signal through a non causal low-pass filter having a finite impulse response with 1+2×J×M non-zero coefficients, J being an integer; and
said processing of said expanded residual sampled voice signal through a non causal low-pass filter comprises obtaining J temporary samples of the forthcoming frame of the residual sampled voice signal to perform the non causal low-pass filtering without perceptual distortion, said J temporary samples being obtained by filtering the first J samples of the forthcoming frame of the sampled voice signal in accordance with spectral and pitch information of the current frame of the sampled voice signal.

8. An analog simultaneous voice and data transmission method as recited in claim 6, wherein said residual sampled voice signal converting further comprises scaling the low-pass filtered signal decimated by the factor N so that the amplitude of said low-pass filtered signal decimated by the factor N ranges within a fixed interval ±B, B being a given amplitude value.

9. An analog simultaneous voice and data transmission method as recited in claim 8, further comprising introducing in the bitstream information about said scaling of the low-pass filtered signal decimated by the factor N.

10. An analog simultaneous voice and data transmission method as recited in claim 1, comprising performing at least a part of recommendation G.729A of the International Telecommunication Union—Telecommunication sector.

11. In an analog simultaneous voice and data transmission system comprising:
means for encoding a sampled voice signal including spectral and pitch information, said encoding means operating at the voice signal sampling rate and comprising:
means for extracting the spectral and pitch information from the sampled voice signal to produce a residual sampled voice signal;
means for converting the residual sampled voice signal into a sequence of residual vectors at a Baud rate;
means for producing a bitstream including (a) non voice data and (b) the extracted spectral and pitch information;
a modem unit operating at said Baud rate, producing an output carrier wave supplied to an analog transmission channel, and comprising:
means for producing a sequence of symbol vectors in response to the sequence of residual vectors and the bitstream;
means for modulating the output carrier wave in response to the sequence of symbol vectors;
the improvement comprising means, forming part of said converting means, for conducting on said residual sampled voice signal a fractional sampling-rate conversion to convert said residual sampled voice signal at said voice signal sampling rate into the sequence of residual vectors at said Baud rate, said conducting means comprising means for anti-aliasing filtering the residual sampled voice signal, whereby the encoding means operates at a voice signal sampling rate independent of said Baud rate.

12. An analog simultaneous voice and data transmission system as recited in claim 11, wherein the residual sampled voice signal includes sharp peaks in which most of the energy of the residual sampled voice signal is concentrated, and wherein said converting means comprises means for peak-dispersion filtering, prior to conducting the fractional sampling-rate conversion, the residual sampled voice signal to disperse said concentration of energy and thereby reduce the amplitude range of the residual sampled voice signal without modifying spectral magnitude properties of said residual sampled voice signal.

13. An analog simultaneous voice and data transmission system as recited in claim 12, wherein said peak-dispersion filtering means comprises a time invariant all-pass filter having an impulse response spread over several samples of the voice signal.

14. An analog simultaneous voice and data transmission system as recited in claim 12, wherein said peak-dispersion filtering means comprises an all-pass filter having a slowly time-varying transfer function to adjust a time-varying parameter related to a speaker's average pitch rate.

15. An analog simultaneous voice and data transmission system as recited in claim 11, wherein said means for conducting on said residual sampled voice signal a fractional sampling-rate conversion comprises means for shifting the voice signal sampling rate by a factor M/N, where M and N are integers that verify, or closely verify, the following equality:

$$\frac{M}{N} = \frac{2R}{F}$$

where R is the Baud rate and F is the voice signal sampling rate.

16. An analog simultaneous voice and data transmission system as recited in claim 15, wherein:
- the fractional sampling-rate conversion is a fractional down-sampling-rate conversion, and said shifting means comprises means for expanding the residual sampled voice signal by inserting M−1 zeros between each pair of successive samples of the residual sampled voice signal; and
- the anti-aliasing filtering means comprises means for low-pass filtering the expanded residual sampled voice signal with a normalized cut-off frequency of π/N radians to produce a low-pass filtered signal decimated by the factor N.

17. An analog simultaneous voice and data transmission system as recited in claim 16, wherein:
- the sampled voice signal and the residual sampled voice signal are formed of samples grouped into successive frames having a fixed duration;
- said means for low-pass filtering the expanded residual sampled voice signal comprises:
  - a non causal low-pass filter having a finite impulse response with 1+2×J×M non-zero coefficients, J being an integer; and
  - means for obtaining J temporary samples of the forthcoming frame of the residual sampled voice signal to perform the non causal low-pass filtering without perceptual distortion, said obtaining means comprising means for filtering the first J samples of the forthcoming frame of the sampled voice signal in accordance with spectral and pitch information of the current frame of the sampled voice signal to obtain said J temporary samples.

18. An analog simultaneous voice and data transmission system as recited in claim 16, wherein the converting means further comprises means for scaling the low-pass filtered signal decimated by the factor N so that the amplitude of said low-pass filtered signal decimated by the factor N ranges within a fixed interval ±B, B being a given amplitude value.

19. An analog simultaneous voice and data transmission system as recited in claim 18, further comprising means for introducing in the bitstream Information about the scaling of the low-pats filtered signal decimated by the factor N.

20. An analog simultaneous voice and data transmission system as recited in claim 11, comprising means for performing at least a part of recommendation G.729A of the International Telecommunication Union—Telecommunication sector.

* * * * *